United States Patent
Stone et al.

(10) Patent No.: US 6,568,525 B2
(45) Date of Patent: May 27, 2003

(54) VERTICAL CONVEYOR ASSEMBLY WITH ACCUMULATING PALLETS

(75) Inventors: Frank A. Stone, Macomb Township, MI (US); Scott P. Bethke, Howell, MI (US); Brian R. Dana, Corunna, MI (US)

(73) Assignee: Inno-Veyor, Inc., Livonia, MI (US)

( * ) Notice: Subject to any disclaimer, the term of this patent is extended or adjusted under 35 U.S.C. 154(b) by 0 days.

(21) Appl. No.: 09/852,493

(22) Filed: May 10, 2001

(65) Prior Publication Data

US 2002/0166750 A1 Nov. 14, 2002

(51) Int. Cl.[7] ........................ B65G 25/00; B65G 29/00; B65G 47/84; B65G 49/00
(52) U.S. Cl. ............................ 198/803.2; 198/867.14
(58) Field of Search ..................... 198/867.14, 465.1, 198/465.3, 803.2

(56) References Cited

U.S. PATENT DOCUMENTS

| | | | | |
|---|---|---|---|---|
| 3,297,139 A | * | 1/1967 | Speigle | 198/803.2 |
| 4,431,102 A | * | 2/1984 | Bittner | 198/867.14 |
| 4,757,893 A | * | 7/1988 | Shabram et al. | 198/803.2 |
| 5,282,529 A | * | 2/1994 | Schwammle | 198/465.3 |
| 5,313,048 A | * | 5/1994 | Berg et al. | 219/385 |
| 5,595,545 A | * | 1/1997 | O'Brien | 473/259 |
| 5,735,384 A | * | 4/1998 | Lingo et al. | 198/465.1 |
| 6,019,214 A | * | 2/2000 | Herronen et al. | 198/465.1 |
| 6,047,813 A | | 4/2000 | Herzog et al. | |
| 6,415,906 B2 | * | 7/2002 | Bethke et al. | 198/465.1 |

* cited by examiner

*Primary Examiner*—Christopher P. Ellis
*Assistant Examiner*—Gene O. Crawford
(74) *Attorney, Agent, or Firm*—Brooks & Kushman P.C.

(57) ABSTRACT

An endless roller chain conveyor supports pallets, which independently travel along the horizontal runs of the conveyor, while the roller chain runs continuously. The pallets are attached in a vertical position and may be stopped and held anywhere along the conveyor using mechanically driven stop assemblies located at required load, unload, holdback, or workstation positions assigned to the particular application. The carriers or pallets are driven on the roller chain by way of a guided sprocket, adjustable clutch, alignment bar, and support roller assemblies. The pallets are guided by "V" grooved wheels or other roller or wheel arrangement securing the pallet to a track assembly fitted to the upper support structure which creates a continuous track which allows pallets to travel in a "carousel" fashion. Vertical-type pallets allow for the transport of long products as well as parts commonly carried on the horizontal style of the conveyor.

20 Claims, 9 Drawing Sheets

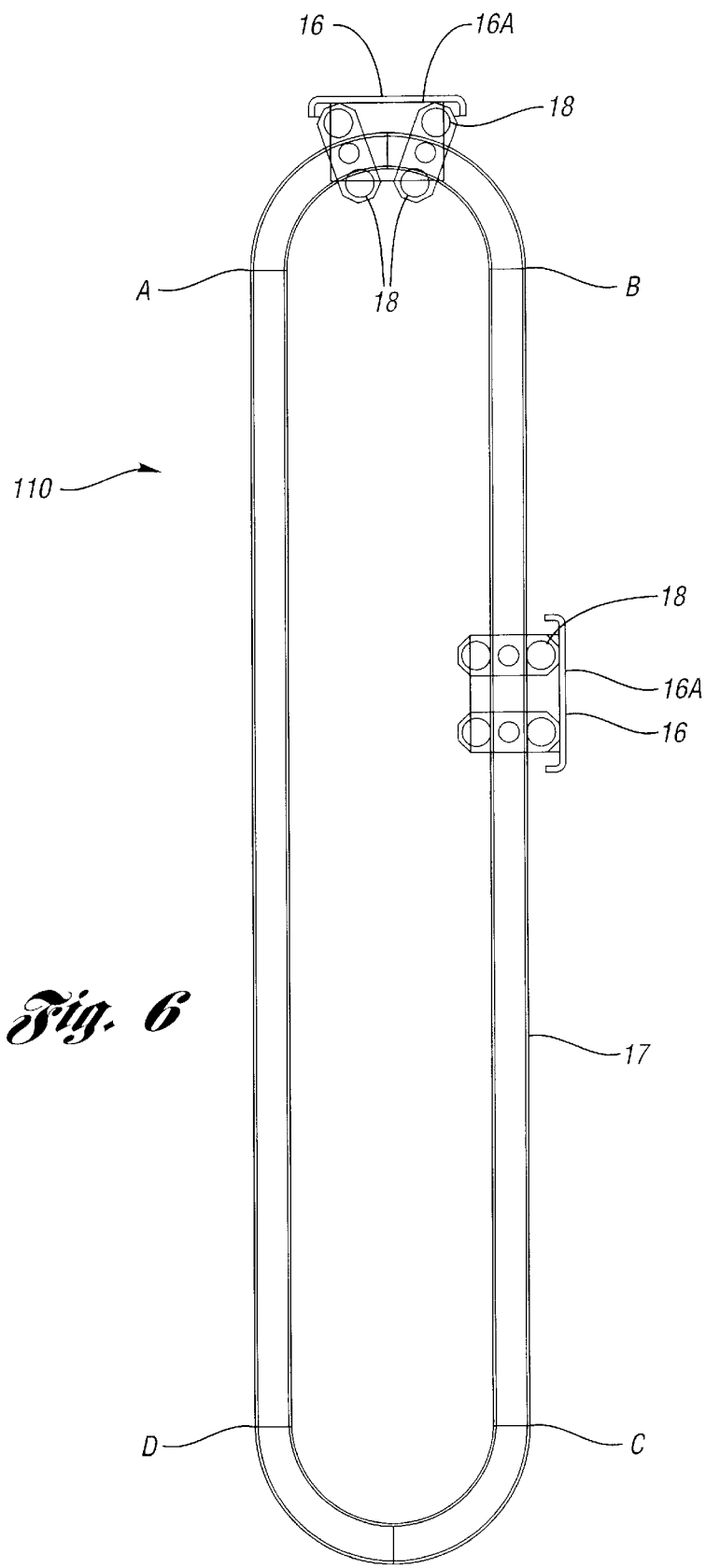

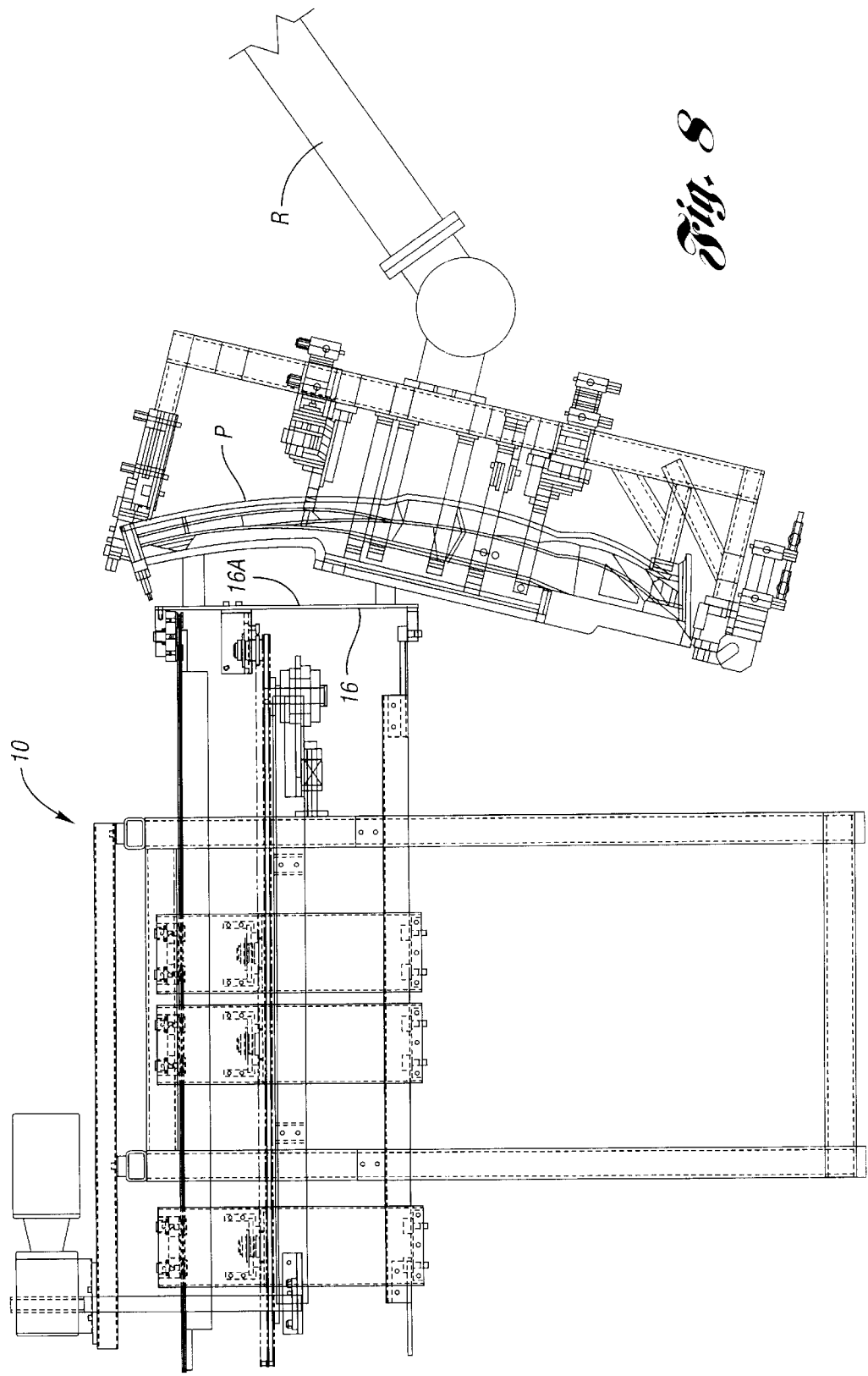

VERTICAL CONVEYOR ASSEMBLY WITH ACCUMULATING PALLETS

BACKGROUND OF THE INVENTION

1. Field of the Invention

The present invention relates to a vertical or carousel-type conveyor assembly wherein the pallets are transported in a vertical orientation and are configured to accumulate along the conveyor at dedicated stop stations or during contact with other accumulated pallets.

2. Background Art

Prior art designs facilitate carrying of parts on a vertical pallet or carrier, but do not allow for accumulation of the pallets along an endless drive chain. These designs were indexing style conveyors, which relied upon the pallets being attached permanently to the drive chains on fixed centers. This type of design is greatly limited in flexibility in comparison to accumulating-type conveyors. An accumulating conveyor is one which allows pallets to stop moving with a continuously moving drive chain at dedicated stop stations, or while contacting other pallets. Accordingly, while the drive chain is continually driven, one or more pallets may be stopped and accumulated while the pallets are loaded or unloaded, or other operations are performed on the parts which are carried by the pallets, such as welding operations, etc.

Accumulating pallet assemblies are available, however these conveyors are of the over/under type, which carry the pallets in a horizontal position. One such conveyor assembly is described in U.S. Pat. No. 6,047,813, which is hereby incorporated in its entirety. This horizontal style conveyor is flexible in operation, but may become excessively wide if it must carry long or wide parts. This is undesirable because floor space is at a premium in manufacturing or assembly plants in which these conveyors are implemented.

Another shortcoming of horizontal-type conveyors is that products cannot be recirculated. The products must be removed prior to a terminal end of the conveyor so that the pallet may be transported, upside down, along the lower run back to a starting terminal end. Also, the over/under style conveyor requires that the pallets may only be stopped for loading and unloading between the terminal ends because special mechanical features are required at the terminal ends for transporting the pallets between the upper and lower runs, and therefore the terminal ends are generally enclosed and not accessible for stopping or not configurable for stopping. Also, the over/under style cannot carry parts around the terminal end from an upper level to a lower level without some mechanical means of holding the product on the fixture or tooling.

It is desirable to provide a much more flexible conveyor configuration capable of multiple load and unload positions while providing pallet accumulation and the ability to carry larger parts. It is also desirable to reduce the footprint of the conveyor equipment required to carry such parts.

SUMMARY OF THE INVENTION

Objects, features and advantages of the invention will become apparent upon reading of the following specification and claims, and are achieved by providing an endless chain arranged in a horizontal configuration and engaged with first and second sprockets which are rotatable about vertical axes of rotation. The endless chain is configured to transport a plurality of pallets along at least one rail by engagement with a clutch sprocket on each pallet. The clutch sprockets enable pallet accumulation anywhere along the length of the conveyor assembly. The vertical conveyor does not require that pallets be stopped for loading and unloading only between the terminal ends.

This "vertical" or "carousel" type conveyor assembly will carry long or wide parts in a more upright position, therefore minimizing the overall footprint of the machine. Since the pallets travel in a continuously upright orientation, the attitude of the product being carried never changes. No other means of holding a part on the fixture or tooling is required during the entire travel of a complete revolution. Another benefit of the vertical design over an over/under style conveyor is the ability of the user to allow products to be recirculated if not removed prior to a terminal end.

The clutch sprockets on the carriers or pallets provide resistance to the chains by means of adjustable clutches and alignment bars. The adjustable clutches allow for adjustment of rolling resistance to accommodate the particular load requirements of the specific application for a particular machine. The sprockets are engaged on the inside of the multi-strand roller chain and the alignment bars are riding on the outside of the multi-strand roller chain.

A single driven sprocket located at the drive end of the conveyor drives the multi-strand roller chain. At the opposing end of the conveyor a similar sprocket acts as an idler and/or take-up sprocket to allow for proper tensioning of the multi-strand roller chain.

Unlike the horizontal-type accumulating pallet conveyor, the sprockets are mounted in such a way as to have the center shafts mounted vertically.

Each individual pallet or carrier is both supported and guided by a series of articulating "V"-grooved wheels assemblies which engage a mating "V" section machined track having a continuous path with straight runs and curved returns fitting together in a smooth and continuous path. This configuration is preferred to provide for a tight and more precise fit of the pallet or carrier relative to the track to maintain a tight tolerance. For some more forgiving applications, other guide wheel arrangements may be applied. The bottom of each pallet or carrier may have similar guides or simpler roller configurations depending on the particular application for a machine.

BRIEF DESCRIPTION OF THE DRAWINGS

FIG. 6 shows a conveyor assembly plan view illustrating the engagement of the carrier or pallet guide rollers to the endless track arrangement;

FIG. 8 shows a side elevation of unit with typical product being carried and interfaced with a robot for either loading or unloading the product to a pallet.

DETAILED DESCRIPTION OF THE PREFERRED EMBODIMENTS

Figure 1:
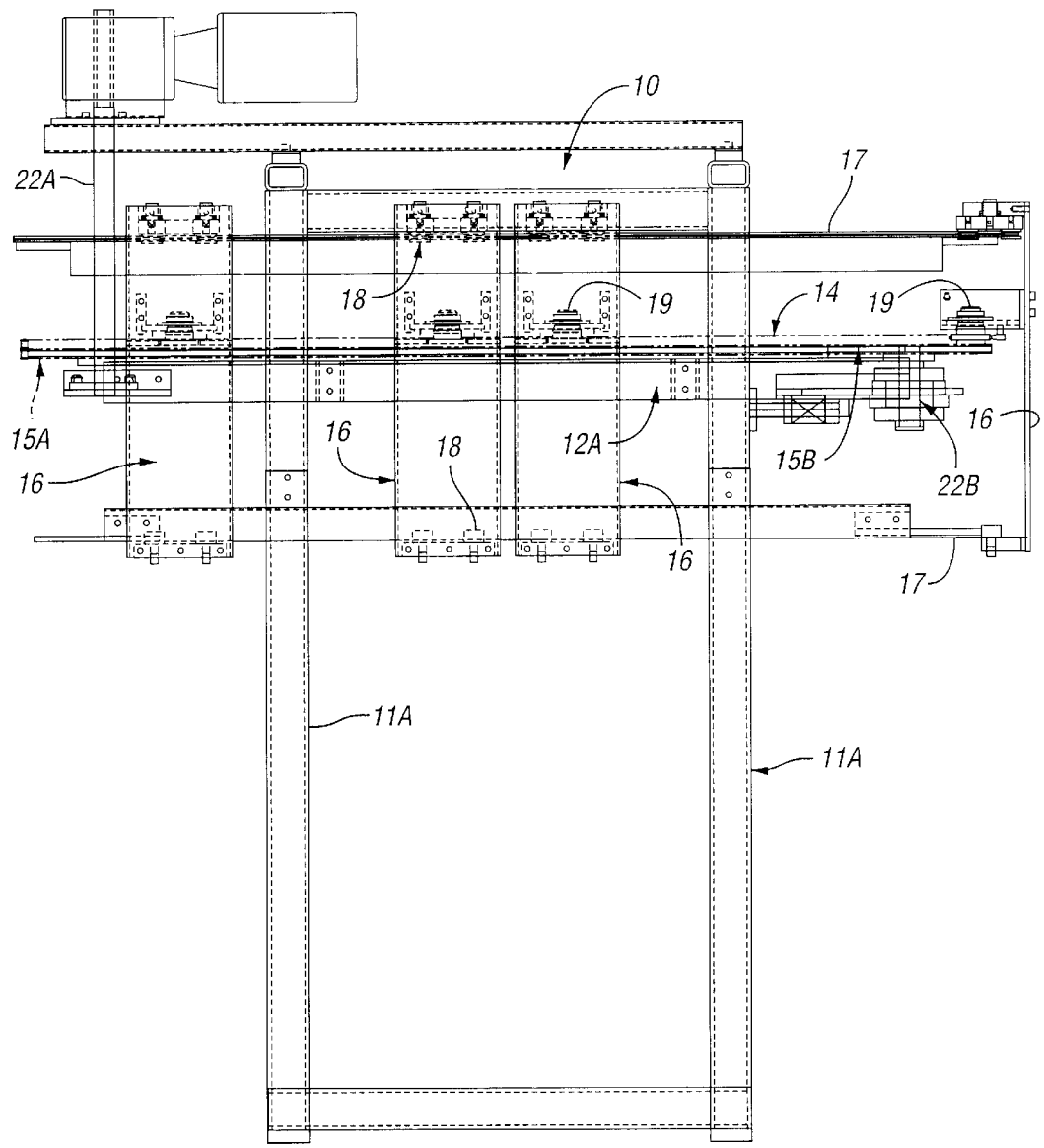
FIG. 1 is a side elevation view of a vertical or carousel chain-driven accumulating pallet conveyor according to the present invention.
Figure 2:
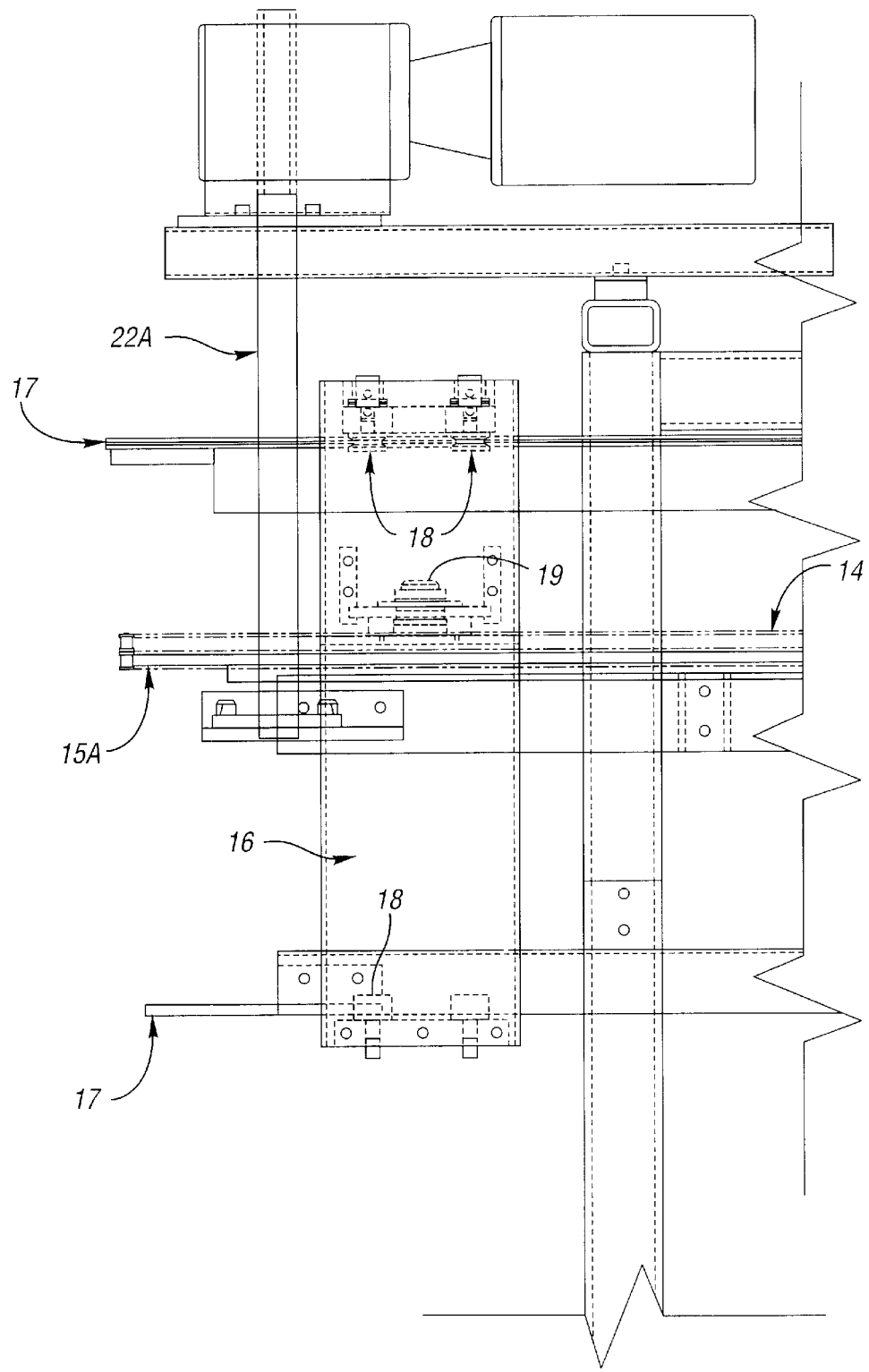
FIG. 2 is a side view of the drive terminal end of the conveyor.
Figure 3:
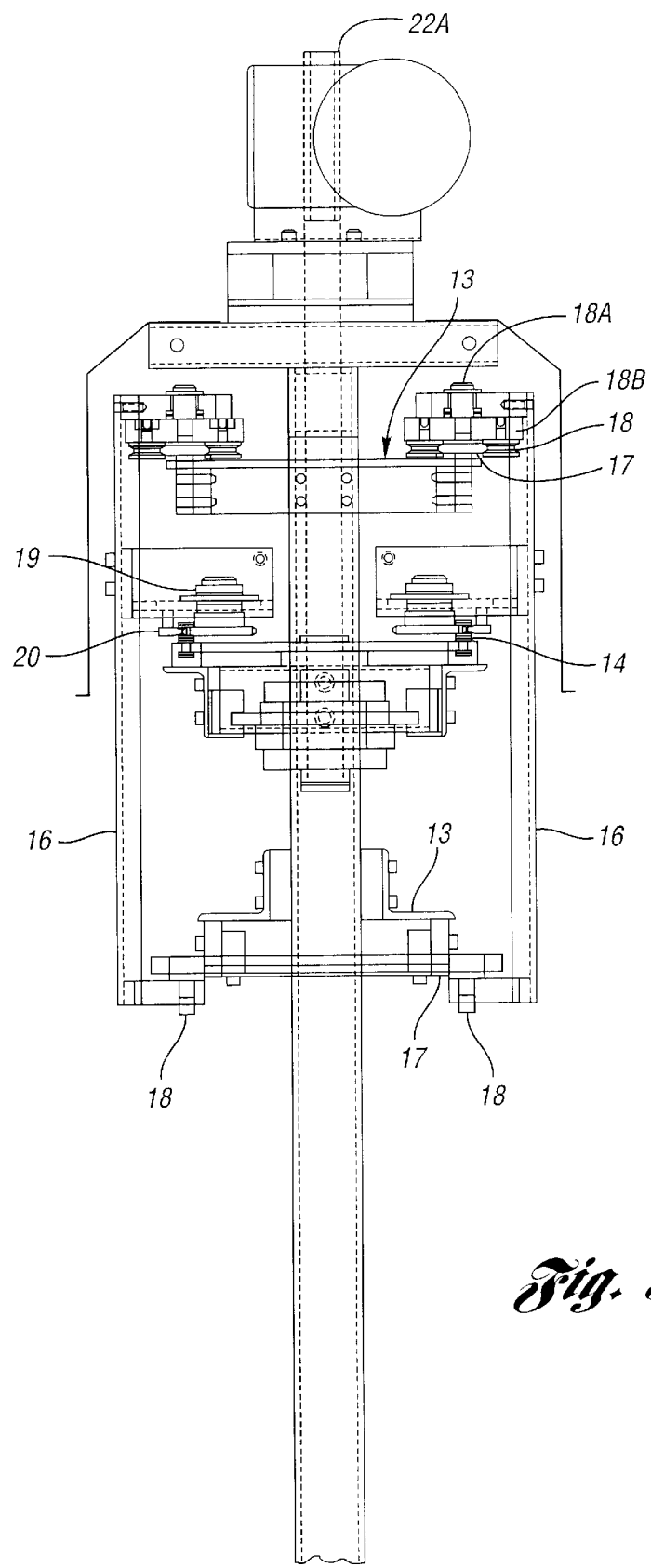
FIG. 3 is a sectional end view of the drive terminal end of the conveyor.

In the following detailed description, certain specific terminology will be employed for the sake of clarity and particular embodiments are described in accordance with 35 U.S.C. §112, but it is understood that the same is not intended to be limiting and should not be so construed inasmuch as the invention is capable of taking many forms and variations within the scope of the appended claims.

Referring to the drawings, FIGS. 1–6 illustrate a conveyor 10 according to the present invention, which includes the conveyor support frames 11A, multi-strand roller chain support 12A, upper and lower track cross members 13, multi-strand roller chain 14, terminal roller chain sprockets 15A, 15B, driveshaft 22A, and pallet assemblies 16.

Each pallet assembly 16 is supported primarily from the upper guide track 17 upon which the pallet guide rollers 18 travel along the horizontal runs of the conveyor. The wheel 18 transports the majority of the weight load of the pallet, which reduces the carrying load of the multi-strand roller chain 14. Each wheel to track assembly consists of the following: "V" track section 17, "V" grooved wheels 18 in pairs which engage the track 17, the wheel mount assembly to pallet or carrier with pivot shaft 18A, and the "V" grooved wheel attachment plate 18B. The attachment plate 18B allows the wheels 18 to pivot slightly as the pair of wheels 18 trap the track section 17 and negotiate the terminal end curved sections of the track 17 without binding, thus allowing for a continuous and smooth operation.

Figure 4A:
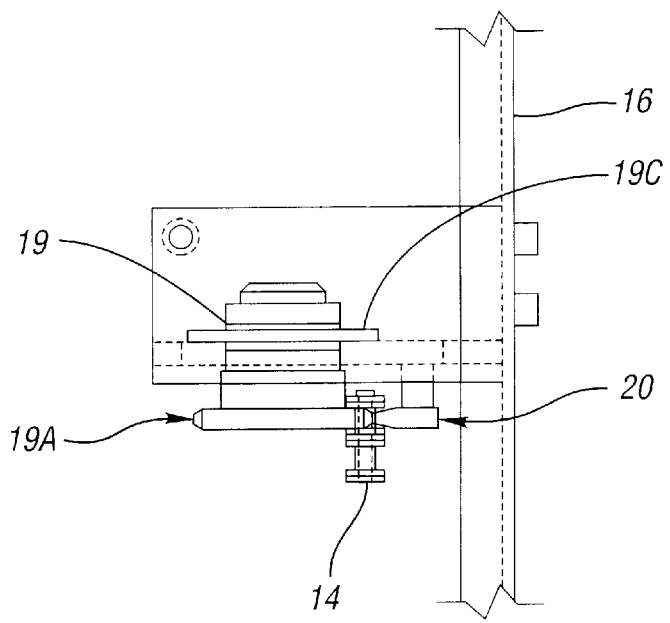
FIGS. 4a and 4b show more detailed side sectional and plan views, respectively, indicating in more detail the roller chain sprockets and chain arrangement.
Figure 4B:
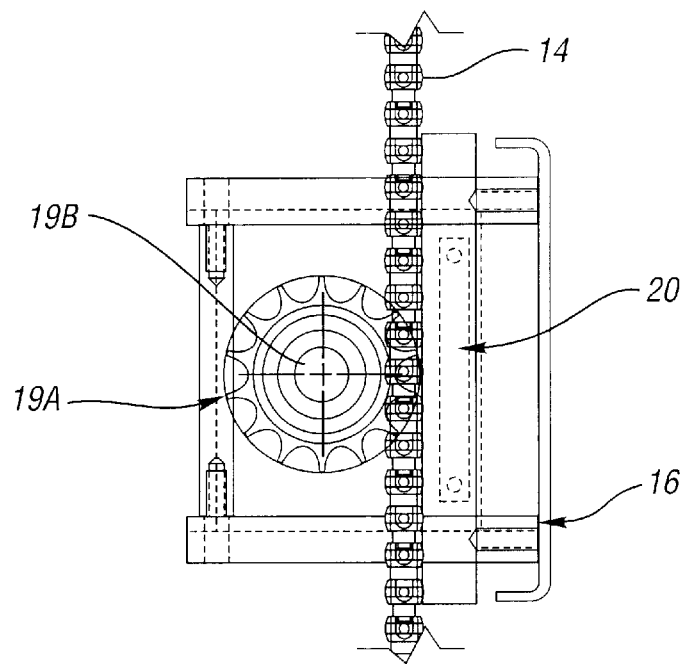
Figure 5A:
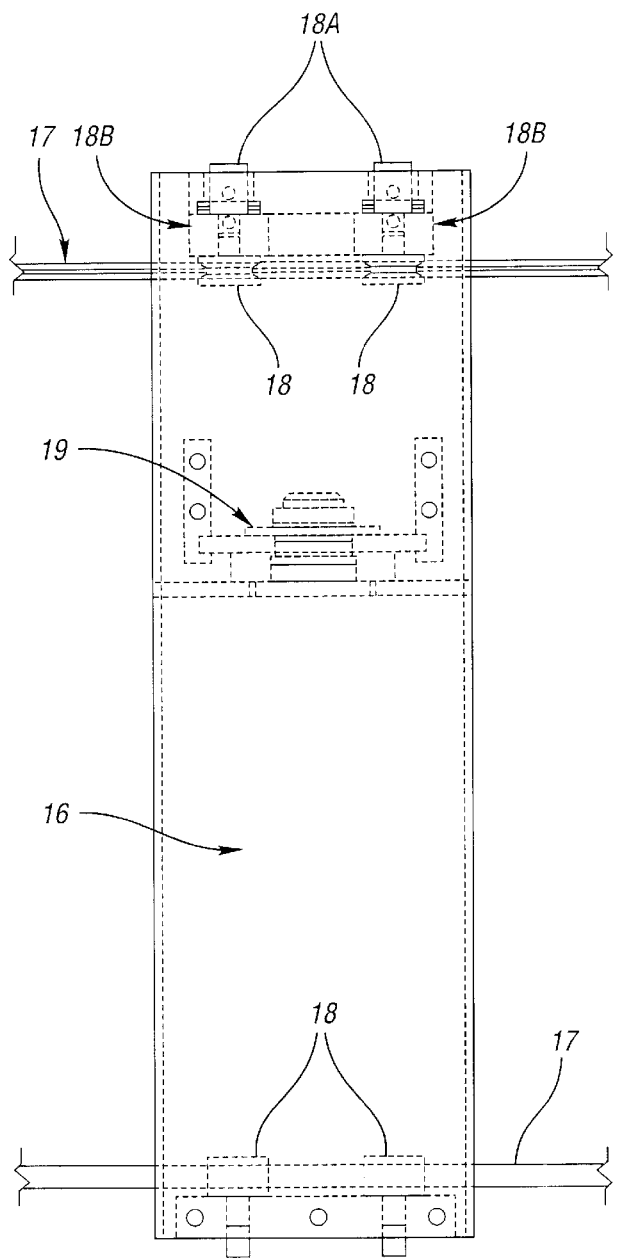
FIGS. 5a and 5b show cross-sectional side and end views, respectively, through a carrier or pallet illustrating the clutch/sprocket assembly, the guidance bars, and the guide rollers.
Figure 5B:
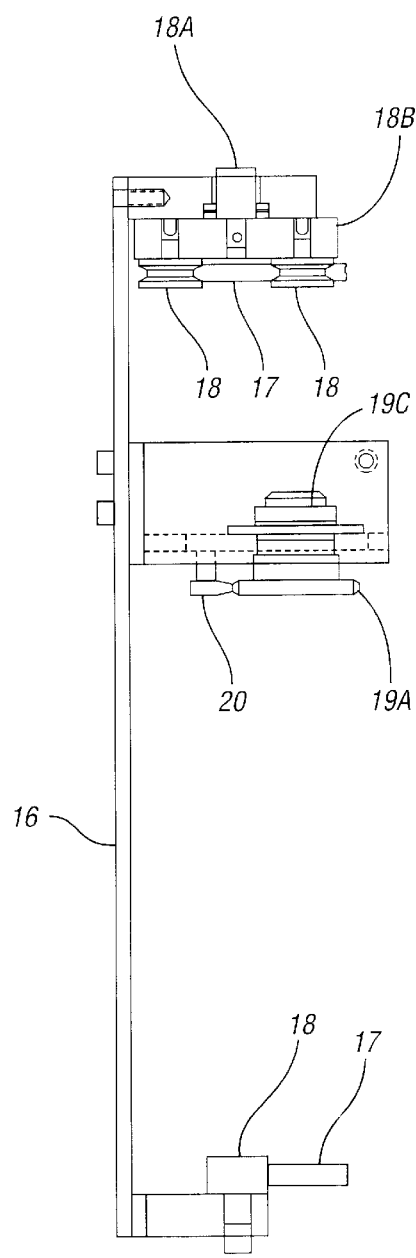

Refer to FIGS. 4a, 4b, 5a and 5b for illustration of the clutch/sprocket assembly 19, the roller chain guide bar 20, and the pallet wheels 18. The sprocket assembly 19 consists of the sprocket 19A, sprocket shaft 19B, and adjustable clutch assembly 19C. Refer, specifically, to FIGS. 4a and 4b for illustration of the clutch/sprocket assembly 19 engaged in the multi-strand roller chain 14.

As the pallet assemblies 16 are entering the terminal end of the conveyor 10, the clutch/sprocket assemblies 19 are engaged in the multi-strand roller chain 14 and as they are driven by friction the pallet assembly will traverse the radius of the terminal end sprocket 15A, 15B. The clutch/sprocket assemblies are mounted in a floating track which allows for variations in the track assembly and provides a means of tightening the chain 14 at the take-up terminal end of the machine 15A, 15B. Upon initial installation and occasionally over the lifetime of the machine, it will become necessary to take up the slack in the chain 14. With the floating sprocket/clutch 19 assembly, the change in centerline distance will increase when the take up is tightened and the sprocket/clutch will move in relation to the mounting surface of its pallet while the pallet 16, the upper guide track 17, lower guide track 17A, and the resulting interface geometry for product loading or unloading from the pallets, whether manual interface or automated interface, will remain the same, preventing any changes in the operations due to routine maintenance.

The clutch/sprocket assembly 19 allows the pallet to travel at the chain travel rate on the multi-strand roller chain 14 as the clutch provides rolling resistance on the sprocket engaged in the roller chain 14. This action will continue until either a stop is energized or a pallet stops and requires that accumulation is necessary. In either case, the clutch assembly allows sufficient slippage with regard to the sprocket that the chain 14 freewheels beneath the guide bar 20 and the sprocket 19A.

Referring to FIG. 6, this embodiment of the conveyor assembly 110 includes curved runs between points A and B and between points C and D. The conveyor assembly 110 also includes straight runs between points B and C and between points A and D. The conveyor assembly 110 is configured so that each pallet 16 has a vertically oriented carrier surface 16A which is substantially parallel to the drive chain or to the V-track section 17 along the straight runs (B to C and A to D), and the carrier surface 16A is substantially tangential to the drive chain or to the track 17 along the curved runs (A to B or C to D) so that the carrier surface always faces away from the conveyor assembly. In this configuration, a work cell may be positioned anywhere around the periphery of the conveyor assembly 110 because parts carried on the carrier surface 16 would be accessible at any location along the conveyor assembly 110, including around the curved ends (A to B or C to D) of the conveyor assembly 110.

Figure 7A:
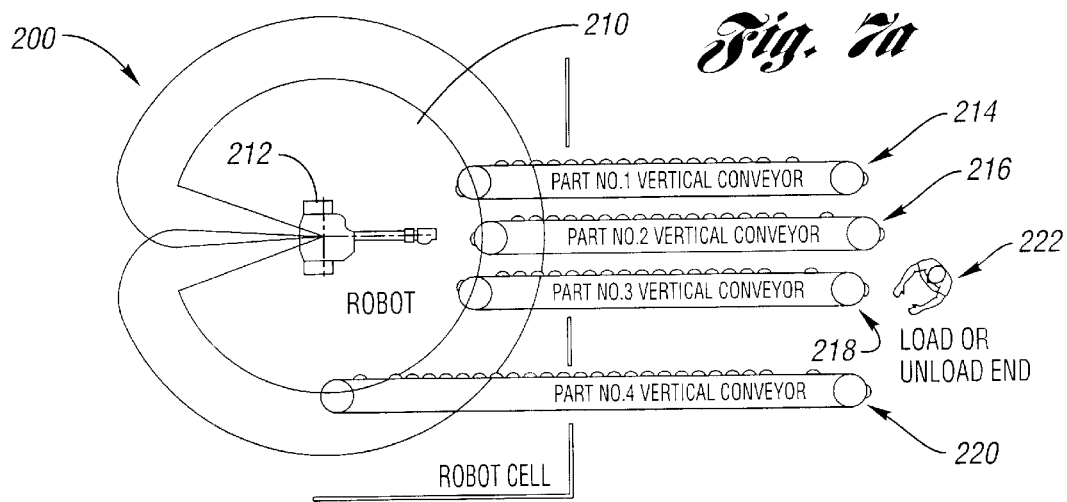
FIGS. 7a–7c schematically illustrate various system configurations which are possible using the vertical accumulating pallet conveyor.

Accordingly, a plurality of conveyor assemblies could be positioned adjacent a particular work cell, wherein the work cell may interface with the conveyors at any point along the periphery of the conveyors. This configuration provides considerable part handling flexibility. For example, referring to FIG. 7a, a system 200 is shown for transporting parts with respect to a work cell 210, that includes a robot 212. As shown, a plurality of vertically oriented conveyors 214, 216, 218, 220 are arranged side-by-side to transport parts loaded by an operator 222 to the work cell 210 for manipulation by the robot 212. Because of the parallel or tangential configuration of the carrier surface of each pallet, as described previously with reference to FIG. 6, the parts carried by each pallet on the conveyors 214, 216, 218, 220 are always presented in the same orientation with respect to the robot 212, regardless of the position of the conveyors with respect to the work cell.

Figure 7B:
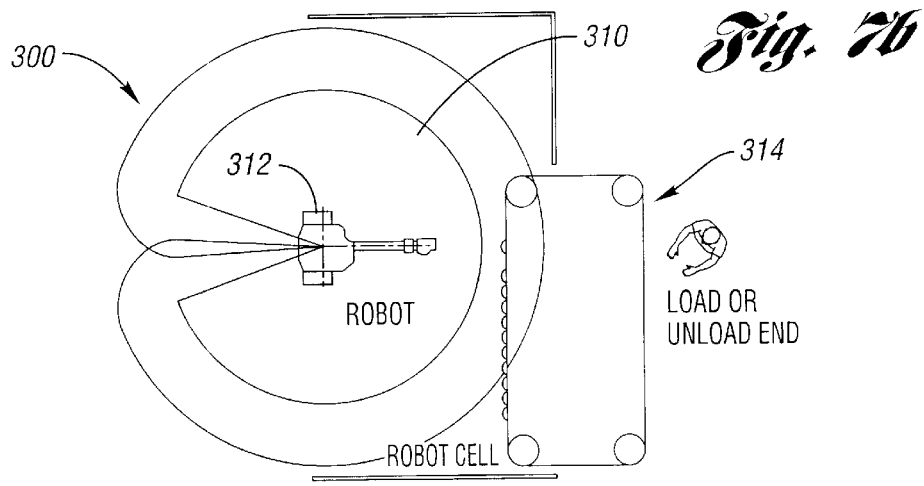
Figure 7C:
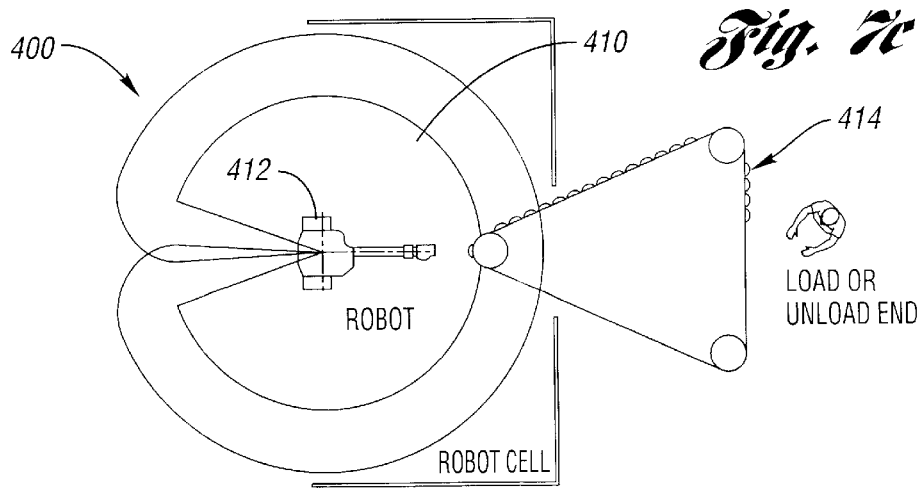

The substantial flexibility of this design is further illustrated in FIGS. 7b and 7c. FIG. 7b shows a system 300 for handling parts which includes a work cell 310 having a robot 312 positioned adjacent a rectangular conveyor assembly 314. As shown in FIG. 7c, the system 400 includes a triangular conveyor assembly 414 positioned adjacent a work cell 410 including a robot 412. An endless variety of configurations of conveyors and work cells could be implemented with the present invention while minimizing needed floor space for the system.

FIG. 8 shows a part P being retrieved from the conveyor assembly 10 by a robot R in a typical application of the present invention. As shown, the part P is presented in a generally vertical orientation facing away from the conveyor assembly 10 by virtue of the orientation of the carrier surface 16a of the pallet 16.

Figure 9:
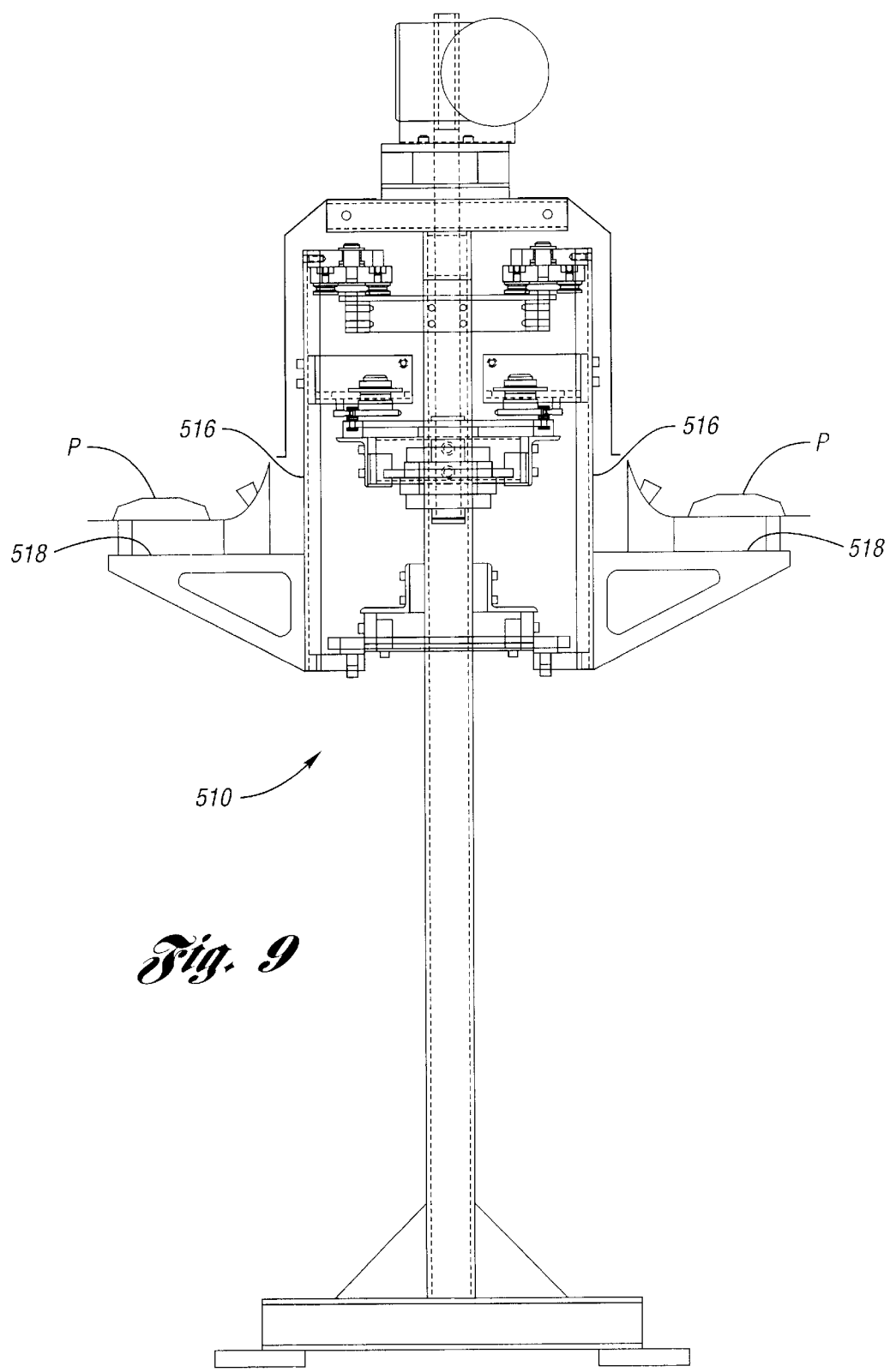
FIG. 9 shows an end view of a conveyor assembly including an alternate pallet design using a horizontal shelf to support product being carried.

FIG. 9 shows an end view of a conveyor assembly 510 in accordance with an alternative embodiment which includes pallets 516 having a horizontal shelf 518 to support products P being carried thereby.

While the best modes for carrying out the invention have been described in detail, those familiar with the art to which this invention relates will recognize various alternative designs and embodiments for practicing the invention within the scope of the appended claims.

What is claimed is:

1. A conveyor assembly comprising:

an endless chain arranged in a horizontal configuration and engaged with first and second sprockets which are rotatable about vertical axes of rotation; and said endless chain configured to transport a plurality of pallets along at least one rail, wherein each pallet is supported by a series of wheels which trap a mating track.

2. The conveyor assembly of claim 1, wherein the conveyor assembly is configured such that each of the plurality of pallets is transported in a continuous vertical orientation, such that a carrier mounting surface of each pallet maintains a vertical orientation facing away from the conveyor assembly throughout its travel along the entire length of the chain so that parts carried by the pallets are accessible to an operator along the entire length of the chain.

3. The conveyor assembly of claim 1, wherein the wheels comprise V-groove wheels.

4. The conveyor assembly of claim 1, wherein the mating track comprises a V guide track.

5. The conveyor assembly of claim 1, wherein each of the pallets comprises a clutch sprocket that engages the chain.

6. The conveyor assembly of claim 5, wherein each said clutch sprocket is arranged on a vertical clutch sprocket axis.

7. The conveyor assembly of claim 5, wherein each said clutch sprocket is secured to the respective pallet by a clutch assembly which is configured to allow selective freewheeling of the clutch sprocket with respect to the chain, as the chain runs continuously, for stopping pallets on the conveyor assembly at loading and unloading stations, and for allowing pallet accumulation.

8. The conveyor assembly of claim 7, wherein the conveyor assembly is configured such that said selective freewheeling may occur anywhere along the entire length of the chain, including directly adjacent the first and second sprockets.

9. The conveyor assembly of claim 7, wherein the freewheeling is adjustable.

10. The conveyor assembly of claim 7 wherein the assembly further comprises a guide bar and the chain freewheels between the guide bar and the sprocket.

11. A conveyor assembly comprising:

an endless chain arranged in a horizontal configuration and engaged with first and second sprockets which are rotatable about vertical axes of rotation; and the endless chain configured to transport a plurality of pallets along at least one rail, wherein each pallet is supported by a pair of V-groove wheels which trap a guide track therebetween.

12. The conveyor assembly of claim 11, wherein the conveyor assembly is configured such that each of the plurality of pallets is transported in a continuous vertical orientation, such that a carrier mounting surface of each pallet maintains a vertical orientation facing away from the conveyor assembly throughout its travel along the entire length of the chain so that parts carried by the pallets are accessible to an operator along the entire length of the chain.

13. The conveyor assembly of claim 11, wherein the guide track comprises a V track.

14. The conveyor assembly of claim 11 wherein the assembly comprises an upper track and a lower track.

15. The conveyor assembly of claim 11, wherein each of the pallets comprises a clutch sprocket that engages the chain.

16. The conveyor assembly of claim 15, wherein each said clutch sprocket is arranged on a vertical clutch sprocket axis.

17. The conveyor assembly of claim 15, wherein each said clutch sprocket is secured to the respective pallet by a clutch assembly which is configured to allow selective freewheeling of the clutch sprocket with respect to the chain, as the chain runs continuously, for stopping pallets on the conveyor assembly at loading and unloading stations, and for allowing pallet accumulation.

18. The conveyor assembly of claim 17, wherein the conveyor assembly is configured such that said selective freewheeling may occur anywhere along the entire length of the chain, including directly adjacent the first and second sprockets.

19. The conveyor assembly of claim 17, wherein the freewheeling is adjustable.

20. The conveyor assembly of claim 17 wherein the assembly further comprises a guide bar and the chain freewheels between the guide bar and the sprocket.

* * * * *